US008367966B2

(12) United States Patent
Takahashi et al.

(10) Patent No.: US 8,367,966 B2
(45) Date of Patent: Feb. 5, 2013

(54) CERAMIC PLASMA REACTOR AND REACTION APPARATUS

(75) Inventors: Michio Takahashi, Nagoya (JP); Hiroshi Mizuno, Nagoya (JP); Masaaki Masuda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1064 days.

(21) Appl. No.: 12/351,210

(22) Filed: Jan. 9, 2009

(65) Prior Publication Data

US 2009/0179545 A1 Jul. 16, 2009

(30) Foreign Application Priority Data

Jan. 16, 2008 (JP) ................................ 2008-007181

(51) Int. Cl.
*B23K 10/00* (2006.01)

(52) U.S. Cl. .......... 219/121.52; 219/121.48; 118/723 R; 156/345.33

(58) Field of Classification Search ............. 219/121.36, 219/121.4, 121.41, 121.43, 121.48, 121.52; 118/723 R; 156/345.33, 345.34; 315/111.21
See application file for complete search history.

(56) References Cited

U.S. PATENT DOCUMENTS

| | | | |
|---|---|---|---|
| 2006/0042545 | A1 | 3/2006 | Shibata et al. |
| 2006/0140545 | A1 | 6/2006 | Takeda et al. |
| 2006/0152163 | A1 | 7/2006 | Miki et al. |
| 2006/0153750 | A1 | 7/2006 | Miyairi et al. |

FOREIGN PATENT DOCUMENTS

| | | | |
|---|---|---|---|
| EP | 1 647 681 | A1 | 4/2006 |
| EP | 1 701 597 | A1 | 9/2006 |
| EP | 1 838 140 | A2 | 9/2007 |
| JP | A-2002-168118 | | 6/2002 |
| JP | A-2004-296553 | | 10/2004 |
| JP | A-2005-123159 | | 5/2005 |
| JP | A-2005-203362 | | 7/2005 |
| JP | A-2005-222779 | | 8/2005 |
| JP | A-2006-210178 | | 8/2006 |
| WO | WO 2004/114728 | A1 | 12/2004 |
| WO | WO 2005/001250 | A1 | 1/2005 |

OTHER PUBLICATIONS

Sep. 9, 2011 Search Report issued in European Application No. 09250086.7.

*Primary Examiner* — Mark Paschall
(74) *Attorney, Agent, or Firm* — Oliff & Berridge, PLC

(57) ABSTRACT

The ceramic plasma reactor includes: a plurality of unit electrodes each of which comprises a plate-shaped ceramic dielectric body 4 and a conductive film 3 embedded in the ceramic dielectric body superimposing them each other with a gap which works as a discharge portion 11, and preferably being formed by sandwiching one unit electrode 2*b* having no through holes 15 by two unit electrodes having plural through holes 2*a* there between. A partition wall plate 9 is provided by facing one of unit electrodes on a side opposite to the gap and being held by a holding member 7 at a predetermined distance so as to form there between a gas introducing-circulating portion 21 for introducing and circulating gas in the through-holes 15 so as to send gas introduced to the gap between the unit electrodes as a discharge portion by applying a voltage thereto to generate plasma.

10 Claims, 6 Drawing Sheets

CERAMIC PLASMA REACTOR AND REACTION APPARATUS

BACKGROUND OF THE INVENTION AND RELATED ART STATEMENT

The present invention relates to a ceramic plasma reactor for generating a plasma by introducing gas between two unit electrodes and a plasma reaction apparatus.

There has been known the fact that silent discharge is caused by applying alternating high voltage or periodic pulse voltage with a dielectric body being disposed between two electrodes to form active species, radicals, and ions in a plasma field formed by the silent discharge, thereby accelerating reaction and decomposition of gas, and that this can be used for removal of harmful components contained in engine exhaust gas or various kinds of incinerator gas.

Since a coaxial cylindrical reactor shown in JP-A-2005-222779 has different electric fields between the central portion and the outer peripheral portion though it has a simple structure, it causes a difference in plasma treatment efficiency, and a large capacity is required in the case of quickly treating a large amount of gas such as automobile exhaust gas purification or fuel reforming.

Since a parallel flat plate type reactor shown in WO2005/1250 pamphlet can give a uniform electric field in a large space, a uniform plasma field can easily be formed by combining with a power source having a small pulse width, and gas can be reformed efficiently by a small reactor by superimposing each other electrodes to have multistages. However, in a gas circulation direction, an efficient gas reaction proceeds in the front portion since much untreated gas is present, but an untreated gas decreases as the gas flows and there arises a problem of inefficient reaction caused in the back portion with respect to the input energy.

In a semiconductor process, a parallel flat plate type reactor is used. JP-A-2004-296553 discloses a structure where through-holes are aligned in the upper electrode, and reaction gas is allowed to flow perpendicularly to the flat plate electrode, thereby supplying untreated gas in all the portions. However, it was difficult to downsizing the apparatus for vehicle installation though the disclosed technique can be applied to a semiconductor-manufacturing process apparatus capable of surrounding the reactor by a large chamber.

WO2004/114728 pamphlet discloses an electrode where a conductor having a through-hole is embedded therein. Since discharge is not caused in the through-hole portion of the conductive film, the gas passing through this portion does not have a plasma reaction. Therefore, the reaction efficiency on the back side can be made higher than in the case where the entire face discharges. However, high efficiency cannot be obtained sufficiently.

Therefore, there has been required a plasma reactor having a parallel flat plate type electrode structure, capable of effectively utilizing a plasma even at the back of the discharge portion with respect to the gas flow, and having high energy efficiency. The present invention aims to provide a small-sized ceramic plasma reactor capable of efficiently treating gas by generating plasma with introducing the gas between the unit electrodes and to provide a plasma reaction apparatus.

SUMMARY OF THE INVENTION

The present inventors found out that the aforementioned problems can be solved by making a wall flow structure having a ceramic electrode, where the conductor (conductive film) having through-holes are embedded, which has a through-hole having a size smaller than a through-hole of a conductive film and capable of suppressing insulation breakdown of a conductor in a portion of a through-hole of a conductor (through-hole of a conductive film), and by making the ceramic electrode face to the flat plate electrode where the conductor with no through-hole is embedded, followed by unitarily forming the discharge portion for generating plasma and a gas passage and firing them. That is, according to the present invention, there is provided the following ceramic plasma reactor.

[1] A ceramic plasma reactor comprising:

a plurality of electrodes each of which is formed of a plate-shaped ceramic dielectric body and a conductive film disposed inside the ceramic dielectric body;

wherein said plurality of electrodes are superimposed each other with keeping a predetermined gap there between, wherein at least one of unit electrodes adjacent each other are superimposed in such a manner that a face opposite to a face which faces to the side of a gap is used as a part constituting a gas circulating forming portion from which a gas circulating portion is formed; said gas circulating portion circulating gas introduced there into, wherein at least one number of the unit electrodes which constitutes a plurality of electrodes has a plural number of through holes; the through holes formed in plate-shaped ceramic dielectric body having a smaller diameter than that of the through holes formed in conductive film at corresponding positions, and wherein the predetermined gap between the electrodes facing each other which is formed opposite to a gap defined as the gas circulating portion works as a discharge portion when a plasma is generated due to the application of a voltage between the unit electrodes while circulating the gas introduced from the gas introducing portion.

[2] The ceramic plasma reactor according to the above [1], wherein the through holes are formed so as to be aligned in at least a gas circulation direction in said at least one member of the unit electrodes.

[3] The ceramic plasma reactor according to the above [1] or [2], wherein the gas introducing-circulating portion has a closed end portion in a gas circulation direction at an opposite side end portion to the introduction side of the gas.

[4] The ceramic plasma reactor according to the above [3], wherein the discharge portion has an open end portion for emitting a gas which is provided at a portion located at an opposite end portion to the introduction side of the gas introducing-circulating portion.

[5] The ceramic plasma reactor according to any one of the above [1] to [4], wherein the discharge portion is the predetermined gap defining by the unit electrodes facing each other and a holding member which holds the unit electrodes with a gap.

[6] The ceramic plasma reactor according to any one of the above [1] to [5], wherein a partition wall plate is superimposed on the side opposite to the gap formed as the part constituting a gas circulating forming portion, and the partition wall plate is held by a holding member with the gap on the opposite face side which is the side opposite to the gap between the unit electrodes and wherein the gas introducing-circulating portion is defined by the holding member and the partition wall plates.

[7] The ceramic plasma reactor according to anyone of the above [1] to [5], wherein said plurality of the unit electrodes comprises a first electrode which has the through holes and a second electrode which has no through holes, the second electrode being sandwiched through said predetermined gap between by two sheets of first electrodes therein, and wherein one side face which faces opposite to the second electrode out of two side faces of the first electrode constitutes the gas circulating forming portion from which a gas circulating portion is formed.

[8] The ceramic plasma reactor according to the above [7], wherein a plurality of sets each of which comprises two sheets of the first electrode sandwiching one sheet of the second electrode there between are superimposed each other by facing the first electrodes of each set.

[9] The ceramic plasma reactor according to the above [8], wherein the first electrodes facing each other of at least two sets of electrodes having been superimposed each other with a gap by the holding member functions as the gas introducing-circulating portion.

[10] A plasma reaction apparatus comprising: a ceramic plasma reactor according to any one of the above [1] to [9] and a nano pulse power source capable of controlling a half pulse width of 1μ sec. or less.

By forming a plurality of through-holes, in at lease one of said plurality of the unit electrodes, preferably in the first electrode, extending from the gas introducing-circulating portion side face, which is an opposite face of a unit electrode having no through holes and being disposed by facing the gas introducing-circulating portion to the unit electrode gap side face on the gap side, introducing gas into a gap between the unit electrodes by circulating the gas from the gas introducing-circulating portion to the through-holes, and generating plasma with the gap between unit electrodes as the discharge portion by applying a voltage between the unit electrodes, gas is introduced into the gap between the unit electrodes through a wide area. Therefore, the gas can be treated effectively by generating plasma.

DESCRIPTION OF REFERENCE NUMERALS

1: ceramic plasma reactor (plasma reactor) 2: unit electrode, 2*a*: first electrode, 2*b*: second electrode, 2*s*: gas introducing-circulating portion side face, 2*t*: unit electrode gap side face, 3: conductive film, 3*h*: conductive film through-hole, 4: ceramic dielectric body, 7: holding member, 9: partition wall plate, 11: discharge portion, 12: non-discharge portion, 15: through-hole (electrode through-hole), 17: closed portion, 18: open end portion, 21: gas introducing-circulating portion

DETAILED DESCRIPTION OF THE INVENTION

Embodiments of the present invention will hereinbelow be described with referring to drawings. The present invention is by no means limited to the following embodiments, and changes, modifications, and improvements may be added thereto within the range of not deviating from the scope of the invention.

Embodiment 1

Figure 1:
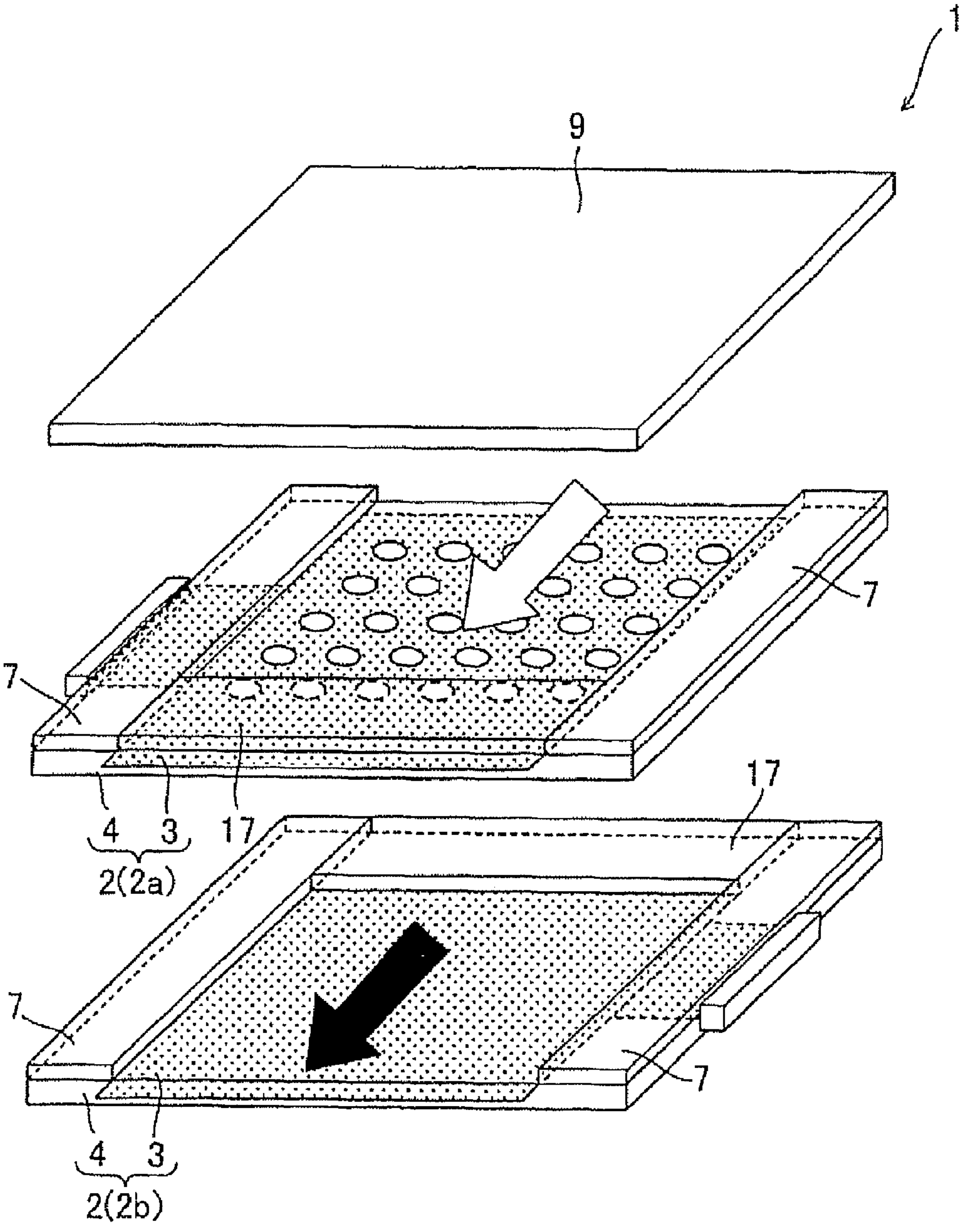
FIG. 1 is an exploded view showing a plasma reactor of the embodiment 1 of the present invention.
Figure 2A:
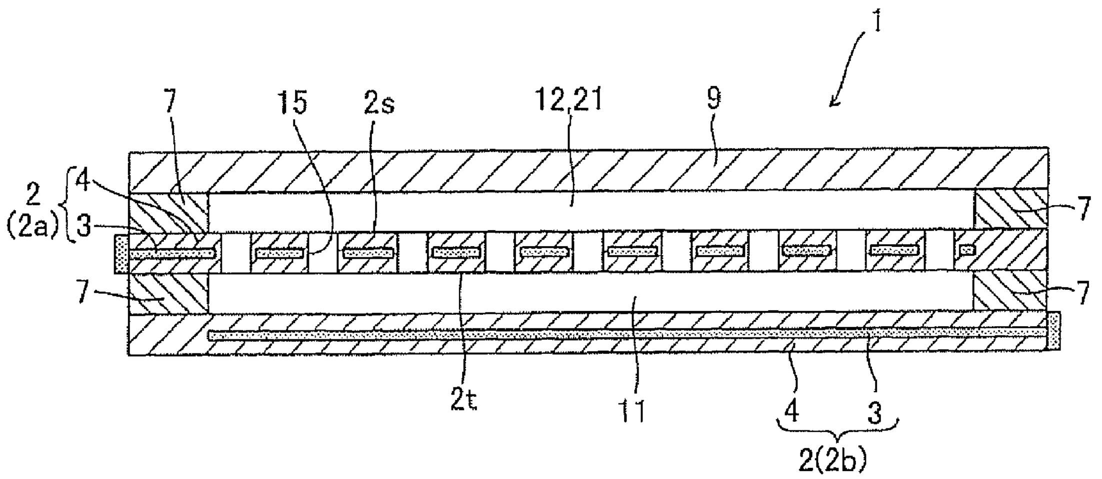
FIG. 2A is a cross-sectional view where the plasma reactor of the embodiment 1 of the present invention is cut along a plane perpendicular to the gas circulation direction.
Figure 2B:
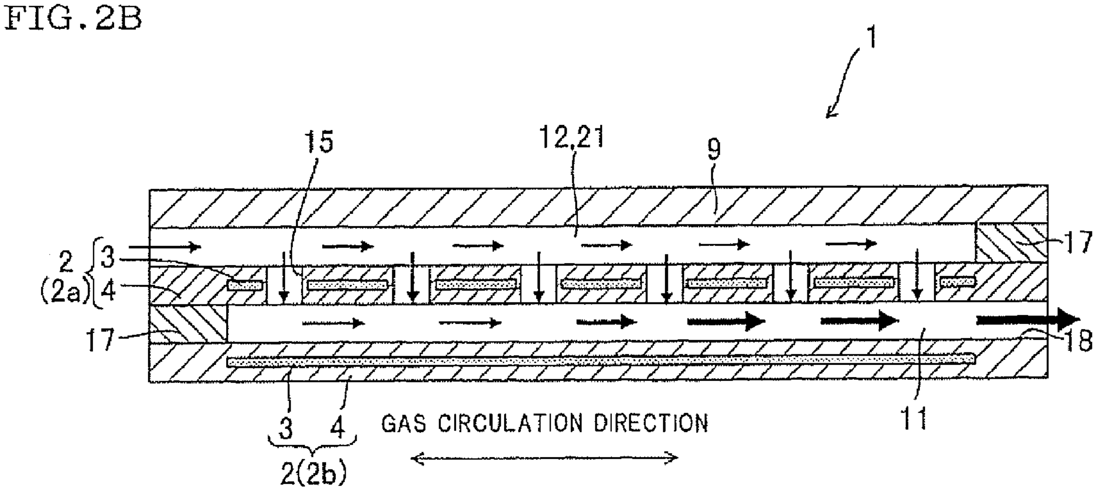
FIG. 2B is a cross-sectional view where the plasma reactor of the embodiment 1 of the present invention is cut along a plane along the gas circulation direction.

FIGS. 1, 2A, and 2B show basic elements of a ceramic plasma reactor (hereinbelow sometimes referred to simply as a "plasma reactor") of the embodiment 1 of the present invention. FIG. 1 is an exploded view, FIG. 2A is a cross-sectional view where the plasma reactor of the embodiment 1 of the present invention is cut along a plane perpendicular to the gas circulation direction, and FIG. 2B is a cross-sectional view where the plasma reactor of the embodiment 1 of the present invention is cut along a plane along the gas circulation direction.

A plasma reactor 1 comprises a plurality of the unit electrodes each of which is formed of a plate-shaped ceramic dielectric body 4 and a conductive film(s) 3 disposed inside the ceramic dielectric body 4 and said plurality of the unit electrodes comprises the first electrode 2*a* and the second electrodes 2*b*, wherein two sheets of the first electrode 2*a* sandwich a sheet of the second electrodes 2*b* with a predetermined gap. Preferably the plasma reactor comprises at least two sets of electrodes being formed by sandwiching the second electrode 2*b* there between by two sheets of the first electrodes 2*a*. The gap between the first electrode 2*a* and the second electrode 2*b* is 0.05 to 50 mm, preferably 0.1 to 10 mm. The first electrode 2*a* and the second electrodes 2*b* are held by a holding member 7 with a gap so as to form a discharge portion 11 between the first electrode and one of the second electrodes, as is depicted in FIGS. 2A and 2B, for example. It is preferable that the holding member 7 and the unit electrodes 2 are unitarily formed and fired. In addition, a partition wall plate 9 held with a gap by the holding member 7 is arranged on the face side opposite to the gap, which forms the discharge portion 11 between the unit electrodes 2*a* and 2*b*, thereby a gas introducing-circulating portion 21 is formed by the holding member 7 and the partition wall plate 9. That is, the holding member 7 and the partition wall plate 9 may constitute a gas introducing-circulating portion-forming portion for forming the gas introducing-circulating portion 21 which introduces and circulates gas, and the plasma reactor 1 is unitarily formed in the state of having a gap via the holding member 7 in the order of the partition wall plate 9, the first electrode 2*a*, and the second electrode 2*b*. It is more preferable that the plasma reactor 1 is tired as a unitary form together with the closed portion 17 in the state of having the gap via the holding member 7 in the order of the partition wall plate 9, the first electrode 2*a*, and the second electrode 2*b* to avoid entire breakage.

Figure 5:
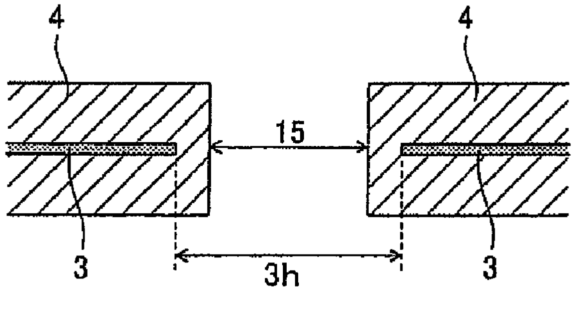
FIG. 5 is an enlarged cross-sectional view in the vicinity of a through-hole.

As is discussed above, there are formed, in at least one of the plurality of the unit electrodes, preferably in the first electrode 2*a*, a plurality of through-holes 15 extending through from the gas introducing-circulating portion side face 2*s*, which is the opposite face of the first electrode 2*a* facing the gas introducing-circulating portion 21, to the unit electrode gap side face 2*t* on the gap side. The through-holes 15 are formed to be aligned at least in the gas circulation direction. In addition, the through-holes 15 formed in the ceramic dielectric body 4 is formed to have a diameter smaller than that of the conductive film through-holes 3*h*, which are the through-holes of the conductive film 3 disposed inside the ceramic dielectric body 4 as the enlarged cross-sectional view in the vicinity of the though-hole 15 shown in FIG. 5 to suppress insulation breakdown of the conductor. In the gas introducing-circulating portion 21, a closed portion 17 is formed in the end portion on the opposite side in the gas circulation direction to the gas introducing side. The discharge portion 11 emits gas with forming the open end portion 18 in the closed portion side 17 in the end portion opposite to the introducing side of the gas introducing-circulating portion 21. That is, by introducing the gas into the gap between the unit electrodes by circulating gas from the gas introducing-circulating portion 21 through the through-holes 15 and applying voltage between the unit electrodes 2*a* and 2*b*, plasma can be generated with the gap between the unit electrodes 2*a* and 2*b* as the discharge portion 11.

Though the positions, number, and size of the through-holes (hereinbelow, sometimes referred to as "electrode through-holes" in order to clearly distinguish the through-holes from the conductive film through-holes 3*h* of the conductive film 3) 15 can be determined arbitrarily, it is preferable to dispose them at a regular interval. In addition, the ratio of the total area of the electrode through-holes 15 to the outer peripheral area of the conductor film 3 is preferably 1% or more and 50% or less, more preferably 2% or more and 30% or less. When the ratio is below 1%, gas back pressure becomes high to decrease fed gas amount, and thereby a sufficient reaction cannot be obtained. When the ratio is above 50%, a discharge area is reduced to lower the reaction efficiency. Further, the ratio of the discharge effective portion except for the conductor film through-hole 3*h* portion to the outer peripheral area of the conductor film 3 is preferably 30% or more and 98% or less, more preferably 50% or more and 90% or less. When it is below 30%, the total area of the discharge portion cannot be secured to lower the reaction efficiency. When it is above 98%, it becomes difficult to suppress the insulation breakdown when the electrode through-holes 15 portion is secured by 1% or more.

The electrode through-holes 15 and the conductor film through-holes 3*h* are preferably disposed concentrically. However, they are not always required to be concentric as long as a sufficient insulation distance is secured. It is necessary to set the electrode through-hole diameter smaller than that of the conductor through-hole diameter. The difference in diameter is preferably 0.5 mm or more, more preferably 1 mm or more though it depends on insulation breakdown strength of the ceramic material to be used. When the difference is below 0.5 mm, insulation breakdown may be caused. The diameter of the electrode through-holes is preferably 0.1 mm to 10 mm, more preferably 1 mm to 5 mm. When the diameter of the electrode through-holes is below 0.1 mm, gas cannot be fed sufficiently. When the diameter is above 10 mm, the discharge area becomes small, and the reaction efficiency cannot be raised.

It is preferable that the conductive film 3 used in the present embodiment employs metal excellent in conductivity as the main component. As the main component of the conductive film 3, a suitable example is at least one kind of metal selected from the group consisting of tungsten, molybdenum, manganese, chromium, titanium, zirconium, nickel, iron, silver, copper, platinum, and palladium. In the present embodiment, the main component means the component which accounts for 50 mass % or more in the whole components. In the conductive film 3, a cermet obtained by adding a ceramic substrate component or a glass component to the above metal component may be suitable for improving adhesion between the substrate and the conductive film in the unitary firing.

The thickness of the conductive film 3 constituting each unit electrode 2 is preferably 0.001 to 0.1 mm, more preferably 0.005 to 0.05 mm from the viewpoint of securing adhesion between the conductive film 3 and the substrate.

In the unit electrode 2, the conductive film 3 is preferably disposed by being applied on a tape-shaped ceramic dielectric body 4. Suitable examples of the application technique include printing, roller coating, spraying, electrostatic coating, dipping, and knife coater. According to such a technique, a conductive film 3 having excellent flatness and smoothness of the surface after the application and having small thickness can easily be formed.

The conductive film 3 can be formed on a tape-shaped ceramic body by mixing a metal powder described above as the main component of the conductive film 3, an organic binder, and a solvent such as terpineol to form a conductor paste and applying the paste on a tape-shaped ceramic dielectric body 4 by the aforementioned technique. In addition, an additive may be added to the aforementioned conductor paste as necessary in order to improve adhesion with the tape-shaped ceramic dielectric body 4 and sinterability.

In addition, the ceramic dielectric body 4 (tape-shaped ceramic body) constituting the unit electrode 2 has a function as a dielectric body as described above. By being used in the state that the conductive film 3 is disposed inside the ceramic dielectric body 4, one-sided discharge such as an arc can be reduced in comparison with the case of conducting the discharge by the conductive film 3 alone, and fine streamer discharge can be generated in a plurality of positions. Since current of electricity is small in such a fine streamer discharge in a plurality of positions in comparison with discharge such as an arc, power consumption can be reduced. Further, since the dielectric body is present, the current between the unit electrodes 2 is limited, and non-thermal plasma of small energy consumption without temperature rise can be generated.

The ceramic dielectric body 4 preferably employs a material having high dielectric constant as the main component. Suitable examples of the main component include aluminum oxide, zirconium oxide, silicon oxide, mullite, cordierite, spinel, titanium-barium based oxide, magnesium-calcium-titanium based oxide, barium-titanium-zinc based oxide, silicon nitride, and aluminum nitride. From these materials, a material suitable for generating plasma having strength suitable for reaction of each component of the target fluid is suitably selected, and a unit electrode is suitably formed by combining some of the materials. In addition, by employing a material having excellent thermal shock resistance, the plasma-generating electrode can be operated even under the high-temperature conditions.

For example, a copper metallization can be used as a conductor for a low temperature co-fired ceramics (LTCC) where a glass component is added to aluminum oxide ($Al_2O_3$). Since a copper metallization is used, an electrode having low resistance and high discharge efficiency, thereby reducing the size of the electrode. Further, a design avoiding thermal stress is possible, and the problem of low strength can be solved. In addition, when an electrode is manufactured with a material having a high dielectric constant such as barium titanate, magnesium-calcium-titanium based oxide, and barium-titanium-zinc based oxide, the size of the electrode is reduced because of high discharge efficiency. Therefore, a structure design capable of reducing generation of thermal stress due to high thermal expansion is possible.

The dielectric constant of the ceramic dielectric body 4 can suitably be determined according to strength of plasma to be generated and is preferably 2.5 to 50 F/m generally.

When the ceramic dielectric body 4 is formed of a tape-shaped ceramic body, the thickness of the tape-shaped ceramic body is not particularly limited and preferably 0.1 to 3 mm. When the thickness of the tape-shaped ceramic body is below 0.1 mm, electric insulation between a pair of adjacent unit electrodes 2 may not be secured. When the thickness of the tape-shaped ceramic body is above 3 mm, downsizing is hindered, and increase of the distance between the electrodes leads to increase of a load voltage, thereby lower efficiency.

As the tape-shaped ceramic body, there can suitably be employed a ceramic green sheet for a ceramic substrate. The ceramic green sheet can be formed by forming slurry or paste for preparing a green sheet so as to have a predetermined thickness according to a conventionally known technique such as a doctor blade method, a colander method, a printing method, and a reverse roll coater method. The thus formed ceramic green sheet may be subjected to machining such as cutting, grinding, punching, or forming of a communicating hole or may be used as a unitary laminate by thermocompression bonding or the like in the state that a plurality of green sheets are superimposed each other.

As the aforementioned slurry or paste for preparing the green sheet, there can suitably used slurry or paste prepared by blending a suitable binder, sintering auxiliary, plasticizer, dispersant, organic solvent, and the like with a predetermined ceramic powder. Suitable examples of the ceramic powder include powders of alumina, mullite, cordierite, zirconia, silica, silicon nitride, aluminum nitride, ceramic glass, and glass. Suitable examples of the sintering auxiliary include silicon oxide, magnesium oxide, calcium oxide, titanium oxide, and zirconium oxide. Incidentally, the sintering auxiliary is preferably added at a ratio of 3 to 10 parts by mass with respect to 100 parts by mass of the ceramic powder. As the plasticizer, the dispersant, and the organic solvent, a plasticizer, a dispersant, and an organic solvent each used in a conventionally known method can suitably be used.

In addition, the porosity of the ceramic dielectric body 4 is preferably 0.1 to 10%, more preferably 0.1 to 1%. Such a constitution enables to efficiently generate plasma between the unit electrodes 2 provided with the ceramic dielectric body 4 and realize energy saving.

Though the illustration is omitted, the plasma reactor 1 of the present embodiment may further be provided with a power source for applying a voltage to the unit electrodes 2. Though, as the power source, a conventionally known power source can suitably be employed as long as it can supply current capable of effectively generating plasma, a pulse power source is preferable, and there can be used a power source using one system selected from the group consisting of an inductive energy storage (IES) system using an opening switch, a capacitive energy storage system using a short circuiting switch, a pulse forming network system, a magnetic compression system, or a combination thereof in order to produce a small pulse width. Since a small power source having high efficiency and a half pulse width of 1 micro second or less can be manufactured, an inductive energy storage system using an opening switch can suitably be used. As the opening switch in the pulse generation circuit, there can be used a semiconductor switch such as an electrostatic induction type (SI) thyristor, an IGBT, a MOS-FET, or the like. In the case of using high current and high voltage, it is further preferable to use the SI thyristor. Use of such a power source enables to generate plasma further effectively.

Further, a plasma reaction apparatus where a plasma reactor 1 of the present invention and a nano pulse power source capable of controlling the half pulse width 1 μm or less can be constituted. As the nano pulse power source capable of controlling the half pulse width 1 μm or less used in the present invention, there can suitably be used a high voltage pulse power source provided with an inductive energy storage type power source circuit (IES circuit) using an electrostatic induction type thyristor (SI thyristor). Such a constitution enables to generate uniform plasma having high density in a wide range. The details of the "IES circuit) are given in "Inductive Energy Storage Type Pulse Power Source" by Katsuji IIDA, Ken SAKUMA, $15^{th}$ SI Device Symposium (2002). In addition, when the pulse voltage is applied, the peak voltage is preferably 1 to 20 (kV), more preferably 5 to 10 (kV).

In addition, a plasma reactor 1 of the present embodiment may have a constitution where the electric current is supplied by an outside power source instead of the constitution with a power source as described above.

Further, by loading a catalyst on the electrode face on the discharge portion 11 side of the unit electrodes 2, the plasma reaction and the catalyst reaction can be combined, which further proceeds reduction in temperature and size. It is preferable to load as the catalyst at least one selected from the group consisting of platinum, palladium, rhodium, ruthenium, indium, gold, silver, copper, aluminum, nickel, zirconium, titanium, cerium, cobalt, manganese, zinc, tin, iron, niobium, magnesium, lanthanum, samarium, bismuth, vanadium, and barium. The catalyst component may be loaded in the state of oxide or other compounds.

By the above constitution, with circulating gas from an end portion on the opening side of the gas introducing-circulating portion 21 as a non-discharge portion 12 to the other end portion (closed portion 17), the gas is introduced into the gap between the unit electrodes 2*a* and 2*b* by the through-holes 15, and controlled power is individually input in the first electrode 2*a* and the second electrode 2*b*, thereby generating plasma between the first electrode 2*a* and the second electrode 2*b* to treat the gas. Since a plurality of through-holes 15 are formed, gas can be treated by plasma regardless of inlet side or outlet side of the gas in the gas circulation direction, and thereby the reaction can be performed with effectively using the input energy to reduce input power. In addition, since the gas introducing-circulating portion 21 is formed unitarily with the two unit electrodes 2, the plasma reactor 1 can be downsized.

Embodiment 2

Figure 3:
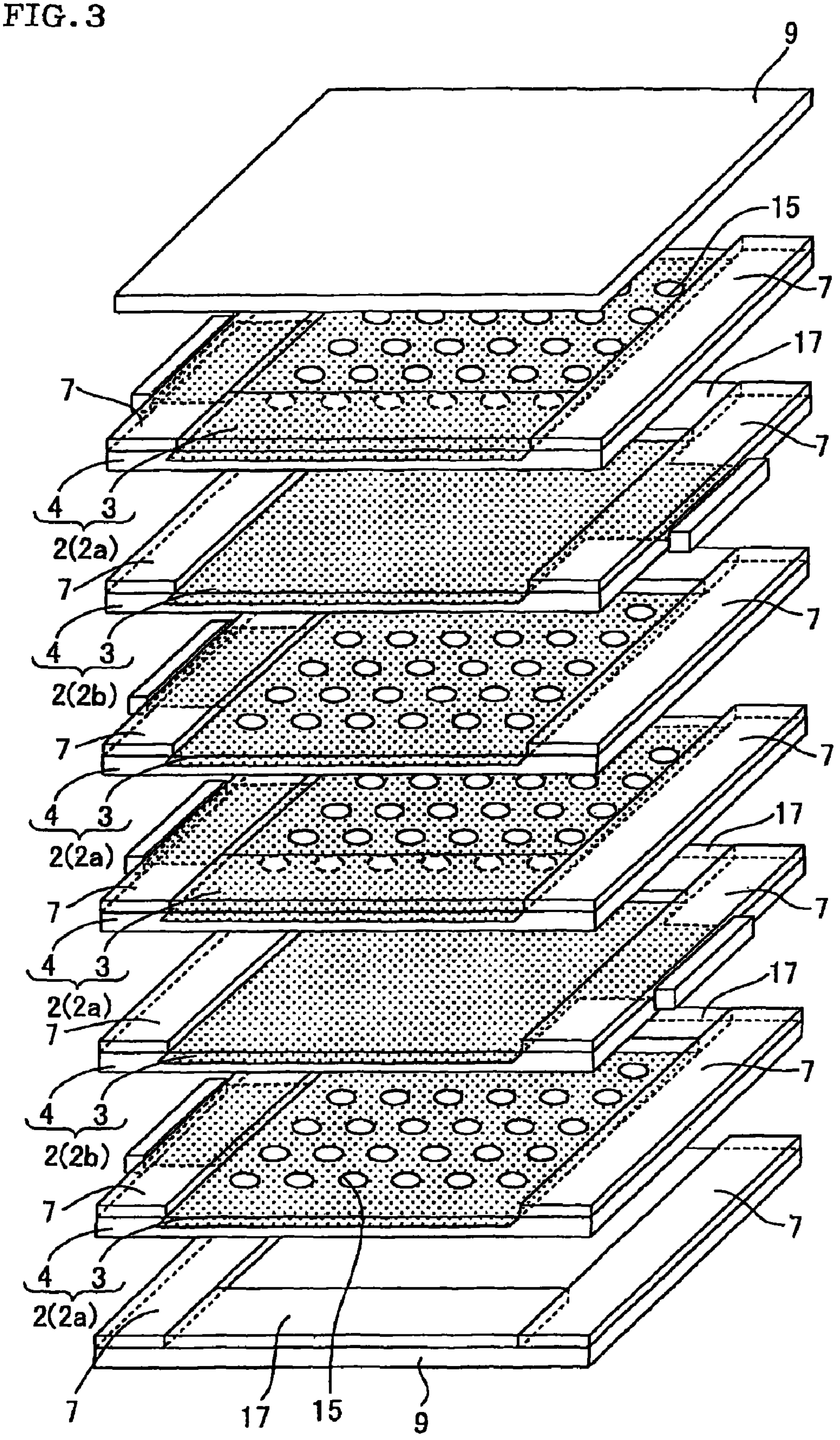
FIG. 3 is an exploded view showing a plasma reactor of the embodiment 2 of the present invention.
Figure 4A:
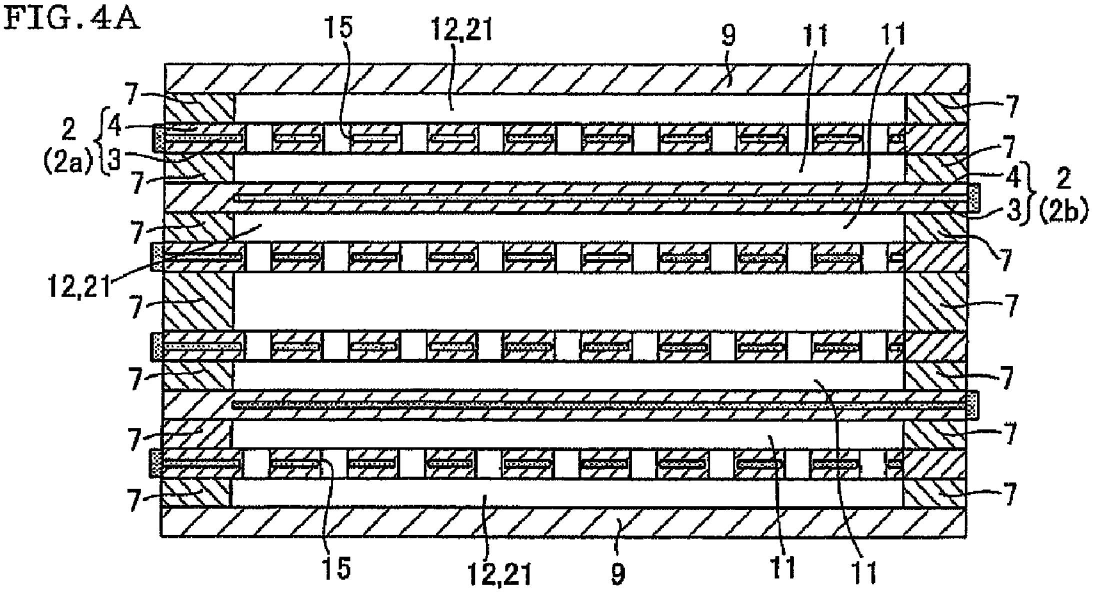
FIG. 4A is a cross-sectional view where the plasma reactor of the embodiment 2 of the present invention is cut along a plane perpendicular to the gas circulation direction.
Figure 4B:
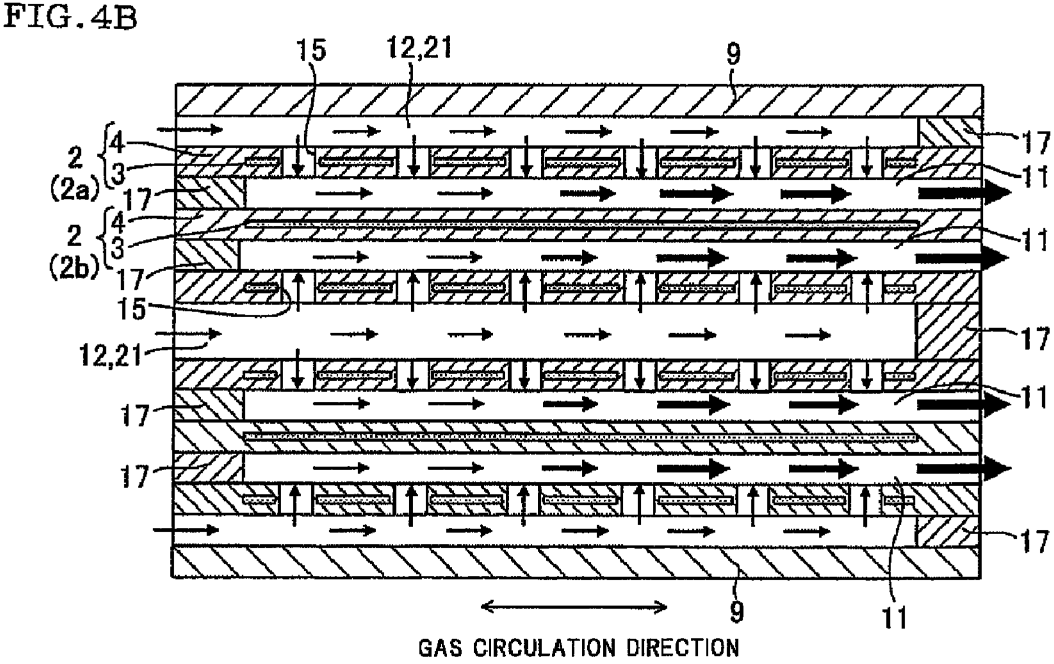
FIG. 4B is a cross-sectional view where the plasma reactor of the embodiment 2 of the present invention is cut along a plane along the gas circulation direction.

FIGS. 3, 4A, and 4B show a plasma reactor 1 of the embodiment 2 of the present invention. FIG. 3 is an exploded view, FIG. 4A is a cross-sectional view cut along a plane perpendicular to the gas circulation direction, and FIG. 4B is a cross-sectional view cut along a plane along the gas circulation direction.

In the plasma reactor 1 of the embodiment 2, the first electrode 2*a* having the through-holes 15 and functioning as a unit electrode 2 on one side is disposed on both one side and the opposite side of the second electrode 2*b* having no through-holes 15 and functioning as a unit electrode 2 on the other side. They are superimposed each other in the order of the first electrode 2*a*, the second electrode 2*b*, and the first electrode 2*a*, and a gas introducing-circulating portion 21 is formed on the opposite side of the second electrode 2*b* with respect to the first electrode 2*a*. Further, a plurality of sets (two sets in the case of the embodiment 2), each being constituted of the first electrode 2*a*, the second electrode 2*b*, and the first electrode 2*a*, are superimposed each other, and the gas introducing-circulating portion 21 is formed between the first electrodes 2*a* and 2*a* of the different electrode sets superimposed each other with a gap being formed by the holding member 7.

By the above constitution, the plasma reactor 1 generates plasma with the gap between the unit electrodes 2*a* and 2*b* as the discharge portion 11 by circulating gas through the through-holes 15 from the gas introducing-circulating portion 21 by introducing the gas into the gap between the unit electrodes 2*a* and 2*b* and applying power between the unit electrodes 2*a* and 2*b*. By the through-holes 15, gas can be introduced over the wide range into the discharge portion 11 to generate stable and uniform plasma with high efficiency. Because the plasma reactor 1 is formed to have multi stages, more gas can efficiently be treated. Incidentally, in the embodiment 2, electrode sets each of which is constituted of two first electrodes 2*a* and one second electrode 2*b*, and the first electrodes 2*a* of the respective sets are superimposed each other to have two stages. However, the sets can be superimposed each other to have two or more stages.

EXAMPLES

Hereinbelow, the present invention will be described in more details on the basis of Examples. However, the present invention is by no means limited to these Examples.

(Test 1)

Plasma reactors having different electrode constitutions were manufactured, and mixed gas containing NO gas was treated by each of the plasma reactors, which were then evaluated for conversion efficiency from NO to $NO_2$. Specific description will hereinbelow be given.

Example 1

A plasma reactor provided with the unit electrodes 2 having as an elemental constitution shown in FIGS. 1, 2A, and 2B was manufactured. Each of the unit electrodes 2 was manufactured by superimposing two sheets of a wall flow type electrodes (first electrodes 2*a*) formed of the plate-shaped ceramic dielectric body 4 having a thickness of 1 mm obtained by superimposing each other 4 pieces of tape containing alumina by 93% and having a thickness of 0.25 mm after firing and the conductive film 3 having a plurality of through-holes disposed inside the ceramic dielectric body 4 and each passing through in the thickness direction of the dielectric body 4 and having a circular cross section cut along a plane in the direction perpendicular to the thickness direction and one sheet of the electrodes (second electrode 2*b*) where the solid conductive film 3 having no through-hole was embedded in the ceramic dielectric body 4; two sheets of the first electrodes sandwiching one sheet of the second electrode there between with a gap of 1 mm, respectively. Incidentally, one of the unit electrodes 2*a*, 2*b* constituting the plasma reactor was on the voltage-loading side, and the other was on the grounding side.

The aforementioned ceramic dielectric body 4 had dimensions of 42 mm (length), 90 mm (width), and 1 mm (thickness), and the conductive film had dimensions of 40 mm (length), 80 mm (width), and 10 μm (thickness). In addition, the conductive film through-holes 3*h* had a diameter of 4 mm and were formed evenly at a regular interval between centers of the holes of 6 mm. The conductive film 3 was manufactured by printing metal paste containing 95 mass % of tungsten on the surface of the ceramic dielectric body 4 and, after the through-holes 15 having a diameter of 3 mm were arranged in the ceramic dielectric body 4 manufactured from an alumina tape in the portions of the through-holes in the conductor, unitarily joining the alumina tape in the passage-forming portion and a ceramic body where a solid conductor was embedded, followed by firing.

A pulse power source using a SI thyristor as an opening switch was connected to the electrode disposed on the voltage-loading side among the electrodes constituting a plasma-generating electrode, and the electrode on the grounding side was connected to the earth.

Then, mixed gas obtained by mixing NO gas with gas adjusted to contain $N_2$ and $O_2$ in a similar proportion as air was passed through the plasma reactor of Example 1 to evaluate for the conversion efficiency from NO in the mixed gas to $NO_2$. As the specific method, NO was put in a gas flow of 10 NL/min. (normal liter/minute) at room temperature to prepare mixed gas having a NO concentration of 200 ppm, and the mixed gas was passed through the plasma generated by the use of the plasma reactor of Example 1.

Example 2

A tape having a thickness of 0.25 mm was produced by the use of pulverized raw material powder having an average particle size of 2 μm and containing cordierite component by 90%. Four tapes were superimposed each other to form an electrode having a thickness of 1 mm and a discharge space and a gas passage portion with a gap of 1 mm between electrodes in the same manner as in Example 1. Using the plasma reactor, the test was performed in the same manner as in Example 1.

Comparative Example 1

Figure 6A:
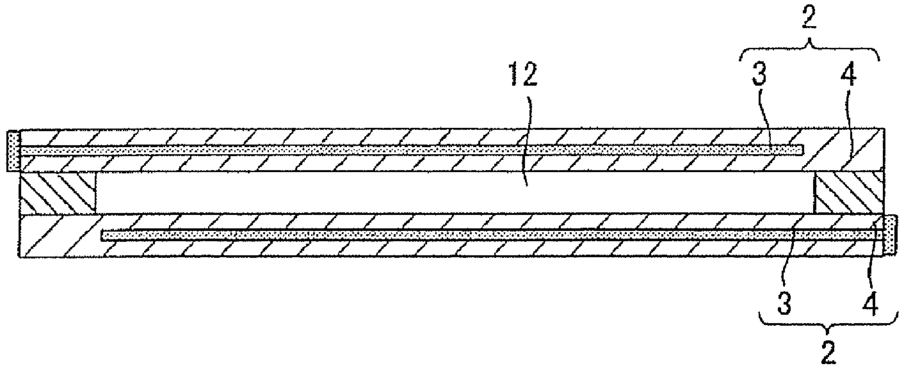
FIG. 6A is a cross-sectional view where a conventional plasma reactor is cut along a plane perpendicular to the gas circulation direction.
Figure 6B:
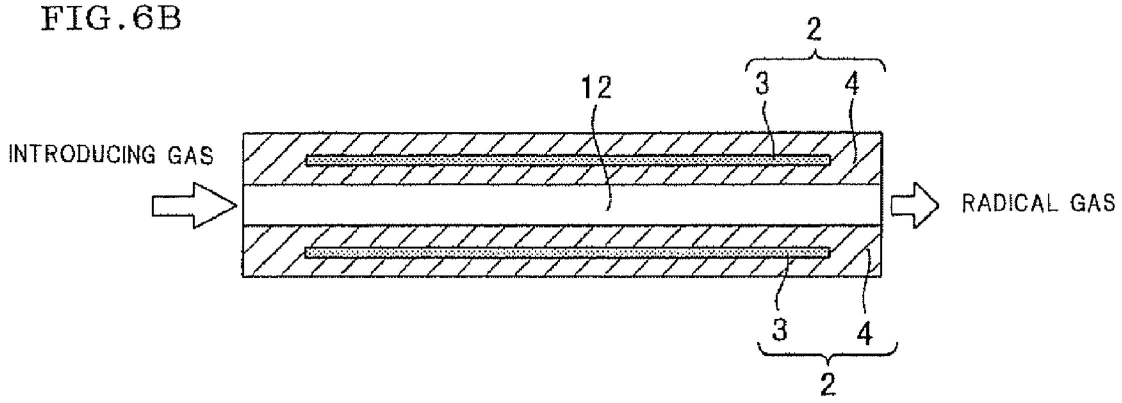
FIG. 6B is a cross-sectional view where a conventional plasma reactor is cut along a plane along the gas circulation direction.

Using a plasma reactor provided with two electrodes shown in FIG. 6A or 6B having been constituted of solid conductor electrodes, the test was performed in the same manner as in Example 1.

Comparative Example 2

Figure 7A:
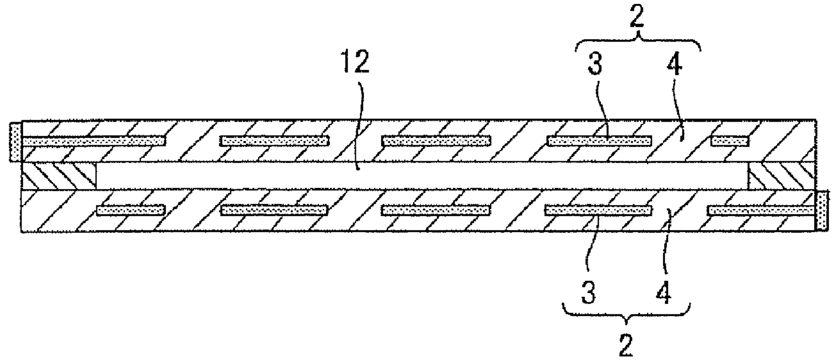
FIG. 7A is a cross-sectional view where a conventional plasma reactor of another embodiment is cut along a plane perpendicular to the gas circulation direction.
Figure 7B:
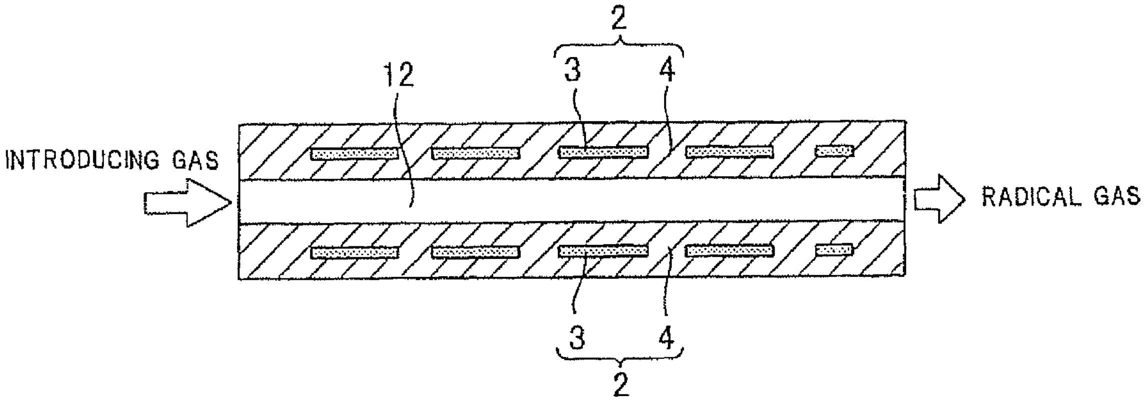
FIG. 7B is a cross-sectional view where a conventional plasma reactor of another embodiment is cut along a plane along the gas circulation direction.

Using a plasma reactor where two electrodes shown in FIG. 7A or 7B having been constituted of conductor electrodes with through-holes, the test was performed in the same manner as in Example 1. The results are shown in Table 1.

TABLE 1

| | Electrode constitution | Gas flow | Input power | Residual NO |
|---|---|---|---|---|
| Example 1 | Wall flow electrode-solid conductor electrode (alumina) | Wall flow type | 10 W | 3 ppm |
| Example 2 | Wall flow electrode-solid conductor electrode (cordierite) | Wall flow type | 8 W | 3 ppm |
| Comparative Example 1 | Solid conductor electrode-solid conductor electrode (alumina) | Through flow type | 30 W | 5 ppm |
| Comparative Example 2 | Conductor electrode with through-holes-Conductor electrode with through-holes (alumina) | Through flow type | 18 W | 5 ppm |

Each of the plasma reactors of Examples 1 and 2, where the wall flow type electrode (first electrode 2*a*) which was faced the solid conductor electrode (second electrode 2*b*) could reduce NO concentration to 3 ppm with a powder of 8 to 10 W. On the other hand, in Comparative Examples 1 and 2, input power had to be increased in comparison with Examples 1 and 2, and residual NO was equivalent to or higher than that of Examples 1 and 2.

(Test 2)

Using plasma reactors having different electrode constitutions as in Test 1, model gas containing hydrocarbon was treated by each of the plasma reactors to evaluate for $H_2$, $CH_4$ concentrations in emitted gas. The specific description will hereinbelow be given.

Example 3

A plasma reactor having an elemental structure shown in FIGS. 3, 4A, and 4B was manufactured, which was a multi-stage lamination type reactor having a four-stage plasma-generating portion (discharge portion 11) and one gas introducing-circulating portion 21, and having the gaps whose distance between adjacent electrodes is 1 mm. Each of the unit electrodes was manufactured in the same manner as in Example 1.

Hydrocarbon-reforming test was performed by the use of a plasma reactor where a pulse power source was connected. At this time, there was used isooctane (i-$C_8H_{18}$) as the hydrocarbon. As the reforming method, partial oxidation reaction of i-$C_8H_{18}$ was employed. Since i-$C_8H_{18}$ was liquid, gas to be introduced into the plasma reactor was heated at 300° C., and a defined amount of i-$C_8H_{18}$ was put in the gas using a high-pressure micro feeder (JP-H type produced by Furue Science K.K.) to be evaporated. The model gas used was constituted of 2000 ppm of i-$C_8H_{18}$, 8000 ppm of $O_2$, and $N_2$ gas as the rest. In addition, the space velocity (SV) of target gas to be reformed inside the plasma reactor was 100,000 $h^{-1}$.

The model gas was introduced into the plasma reactor, and $H_2$ amount in the emitted gas was measured by a gas chromatography (GC, GC3200 produced by GL Sciences, Inc., argon gas was used as the carrier gas) provided with a TCD (thermal conductivity detector), and $H_2$ yield (%) was calculated. At this time, in order to calculate $H_2$ yield (%), standard gas whose $H_2$ concentration had been known was measured by a gas chromatography in advance, and $H_2$ concentration in the reformed gas was checked by the comparison. In addition, in the measurement of ethane ($C_2H_6$) in the model gas to be emitted, helium gas was used as the carrier gas of the GC. The $C_2H_6$ falls under a by-product. In these measurements, using mixed standard gas ($H_2$,$C_2H_6$) whose concentration had been known, $C_2H_6$ concentration in the reformed gas was checked by the comparison.

With $C_2H_6$ concentration of Example 3 as the standard value 1, $C_2H_6$ concentration proportion in Examples 3 and 4 were evaluated. Incidentally, the condition of the pulse power source for generating plasma was a period of 8 kHz, and 3 kV of peak voltage was applied between the electrodes. In addition, the plasma reactor was disposed in an electric furnace, and the interior temperature of the plasma reactor main body was adjusted to 300° C.

$$H_2 \text{ yield } (\%) = H_2 \text{ generating amount (ppm)}/i\text{-}C_8H_{18} \text{ amount (ppm) in model gas} \times 9$$

Comparative Example 3

Isooctane was subjected to a reforming test in the same conditions using a through flow type reactor having a four-stage discharge space obtained by superimposing each other five sheets of solid electrodes with a gap of 1 mm.

Comparative Example 4

Isooctane was subjected to a reforming test in the completely same conditions as those for Example 3 using a through flow type reactor having a four-stage discharge space obtained by superimposing each other five sheets of conductive film-embedded type electrodes with through holes. Together with producing a plasma reactor where plate-shaped ceramic electrodes were disposed in parallel, i-$C_8H_{18}$ amount reforming test was conducted in the same conditions as in the Example 3. Power input into a pulse power source was performed in the same manner.

Incidentally, in any case of Comparative Examples 3 and 4, a reactor where 2 mass % Ru/alumina catalyst was loaded on a plasma-forming face like the Examples was used. Table 2 shows results of measurements of reformed gas formed in Example 3 and Comparative Examples 3 and 4.

TABLE 2

| | Electrode constitution | Gas flow | $H_2$ yield | Ratio of $C_2H_6$ concentration |
|---|---|---|---|---|
| Example 3 | Wall flow electrode-solid conductor electrode (alumina) | Wall flow type | 45% | 1 |
| Comparative Example 3 | Solid conductor electrode-solid conductor electrode (alumina) | Through flow type | 27% | 2.5 |
| Comparative Example 4 | Conductor electrode with through-holes-Conductor electrode with through-holes (alumina) | Through flow type | 30% | 2.2 |

As shown in Table 2, in Examples 3, $H_2$ yield could be improved in comparison with Comparative Examples 3 and 4. In addition, $C_2H_6$ concentration could be reduced. It seems that the reason for such a difference is because the uniform i-$C_8H_{18}$ reforming reaction is caused by plasma in the reactor in Example 3, which shows that a plasma reactor of the present invention is effective in reforming of hydrocarbon.

The test 2 showed an example of partial oxidation. However, even in other reforming methods such as steam reforming using water, and autothermal reforming using oxygen and water, the high hydrogen production rate was gained in comparison with a conventional plasma reactor. That is, it can be said that a plasma reactor of the present invention can be applied to various kinds of reforming methods.

A plasma reactor of the present invention can suitably be used for a reforming reaction of hydrocarbon compounds or alcohols, in particular, for a hydrogen production reaction. Since a large amount of reformed gas can stably be supplied for a long period of time, it can suitably be used for the application of an in-car fuel reformer or the like.

Since a plasma reactor of the present invention enables to generate stable and uniform plasma with high efficiency, it can suitably be used for an exhaust gas treatment equipment, an apparatus for reforming fuel, an ozonizer for refining ozone by allowing oxygen contained in air or the like to react, etc.

What is claimed is:

1. A ceramic plasma reactor comprising:

a plurality of electrodes each of which is formed of a plate-shaped ceramic dielectric body and an electrically conductive film disposed inside the ceramic dielectric body;

wherein the plurality of electrodes is stacked along a stacking direction with a predetermined gap between adjacent electrodes of the plurality of electrodes, wherein a first unit electrode is formed to include a first electrode and a second electrode that are two adjacent electrodes of the plurality of electrodes with the predetermined gap therebetween in such a manner that a face of the first electrode facing away from the predetermined gap forms a part of a gas circulating portion, the gas circulating portion circulating gas introduced there through from a gas introducing portion formed at a first end portion of the gas circulating portion, wherein the first electrode has a plural number of through holes formed in the plate-shaped ceramic dielectric body and a plural number of through holes formed in the electrically conductive film at positions corresponding to the through holes formed in the plate-shaped ceramic dielectric body; the through holes formed in the plate-shaped ceramic dielectric body having a smaller diameter than that of the through holes formed in the electrically conductive film, and wherein the predetermined gap between the first electrode and the second electrode functions as a discharge portion when plasma is generated due to application of a voltage between the first electrode and the second electrode while circulating the gas introduced from the gas introducing portion.

2. The ceramic plasma reactor according to claim 1, wherein the through holes formed in the plate-shaped dielectric body and formed in the electrically conductive film are aligned in at least a gas circulation direction in the first electrode.

3. The ceramic plasma reactor according to claim 1, wherein the gas circulating portion has a closed end portion in a gas circulation direction at a second end portion opposite to the first end portion.

4. The ceramic plasma reactor according to claim 3, wherein the discharge portion has an open end portion for emitting a gas which is provided at a portion located at an opposite end portion to the gas introducing portion.

5. The ceramic plasma reactor according to claim 1, wherein the discharge portion is the predetermined gap defined by the first electrode and the second electrode facing each other and a holding member which holds the first electrode and the second electrode to sustain the predetermined gap.

6. The ceramic plasma reactor according to claim 1, wherein a partition wall plate is provided so that the face of the first electrode facing away from the predetermined gap faces the partition wall plate, and that the gas circulating portion is formed between the partition wall plate and the first electrode, and the partition wall plate is held by a holding member such that the gas circulating portion is defined by the holding member, the partition wall plate, and the face of the first electrode facing away from the predetermined gap.

7. The ceramic plasma reactor according to claim 1, wherein said first unit electrode includes a third electrode of the plurality of electrodes that is adjacent to the second electrode, the third electrode has through holes formed in the plate-shaped dielectric body and the electrically conductive film of the third electrode, the second electrode has no through holes therein and is sandwiched between the first electrode and the third electrode via respective ones of the predetermined gaps, and one side face of the third electrode facing away from the second electrode constitutes a part of another gas circulating portion.

8. The ceramic plasma reactor according to claim 7, further comprising a second unit electrode having identical configuration of the first unit electrode, the first unit electrode and the second unit electrode being stacked together along the stacking direction with the first electrode of the second unit electrode adjacent to the third electrode of the first unit electrode.

9. The ceramic plasma reactor according to claim 8, wherein the first electrode of the second unit electrode and the third electrode of the first unit electrode are stacked in such a way so as to sustain a gap therebetween by a holding member, and the gap functions as an additional gas circulating portion.

10. A plasma reaction apparatus comprising: a ceramic plasma reactor according to claim 1 and a nano pulse power source capable of controlling a half pulse width of 1μ sec. or less.

* * * * *